United States Patent [19]

Kotski

[11] 4,195,894

[45] Apr. 1, 1980

[54] ELECTRICAL CONNECTOR AND ELECTRICAL CONNECTION SYSTEM EMPLOYING THE SAME

[75] Inventor: Edward J. Kotski, Hackettstown, N.J.

[73] Assignee: Amerace Corporation, New York, N.Y.

[21] Appl. No.: 914,081

[22] Filed: Jun. 9, 1978

Related U.S. Application Data

[63] Continuation of Ser. No. 793,481, May 4, 1977, abandoned.

[51] Int. Cl.[2] ...................... H01R 35/00; H02G 11/02

[52] U.S. Cl. ................................ 339/14 R; 191/12.4; 339/28; 339/59 R; 339/75 R; 339/119 C

[58] Field of Search ................ 339/5 RL, 14 L, 14 R, 339/28, 29, 47-49, 59, 119 C, 150, 151, 40, 75; 191/12.2 R, 12.2 A, 12.4

[56] References Cited

U.S. PATENT DOCUMENTS

| | | | |
|---|---|---|---|
| 1,014,718 | 1/1912 | Parsons | 339/59 R |
| 1,975,244 | 10/1934 | Wiseman | 339/29 R |
| 2,086,641 | 7/1937 | Riley | 339/49 R |
| 2,239,653 | 4/1941 | O'Brien | 339/40 |
| 2,770,786 | 11/1956 | Czyzewski | 339/164 R |
| 2,792,559 | 5/1957 | Maberry | 339/32 R |
| 3,130,269 | 4/1964 | Rountree | 339/75 P |
| 3,648,219 | 3/1972 | Goldman | 339/45 M |
| 3,721,944 | 3/1973 | Weidler | 339/59 M |

FOREIGN PATENT DOCUMENTS

| | | | |
|---|---|---|---|
| 695256 | 12/1930 | France | 339/75 P |
| 632052 | 11/1949 | United Kingdom | 339/49 R |

*Primary Examiner*—Neil Abrams

*Attorney, Agent, or Firm*—S. Michael Bender; Ken Richardson; James J. Daley

[57] ABSTRACT

A cable for supplying electrical power in underground mining comprises plural separable sections facilitating cable maintenance. Cable sections are releasably joined by an electrical connector assembly capable of sustaining cable tensile loading and of sufficient flexibility to be taken up and paid out by cable reeling apparatus.

25 Claims, 19 Drawing Figures

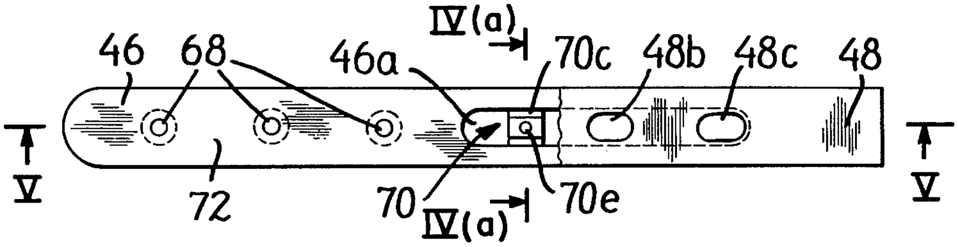
FIG. 4
FIG. 5
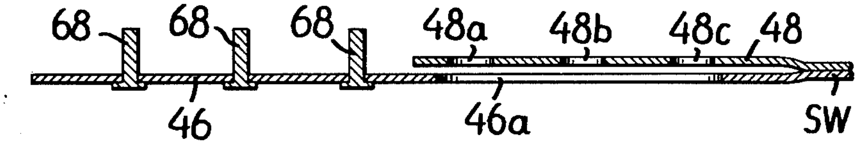
FIG. 5(a)
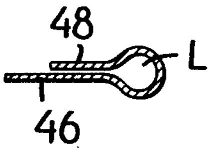
FIG. 4(a)
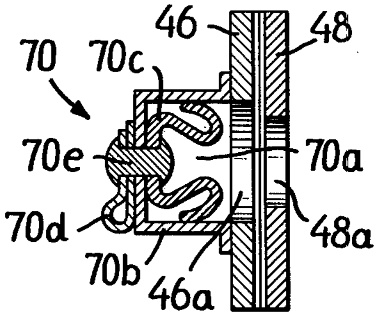
FIG. 6
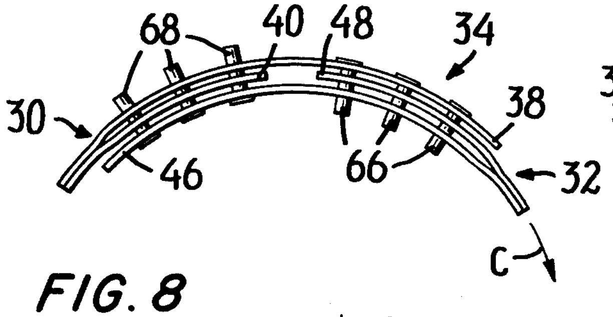
FIG. 7
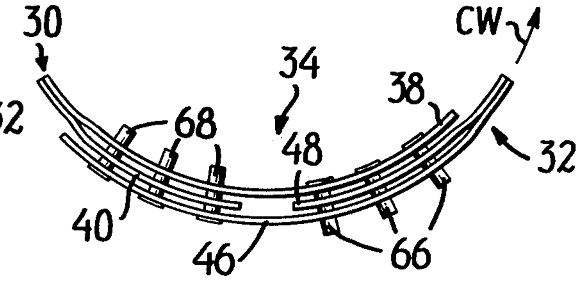
FIG. 8
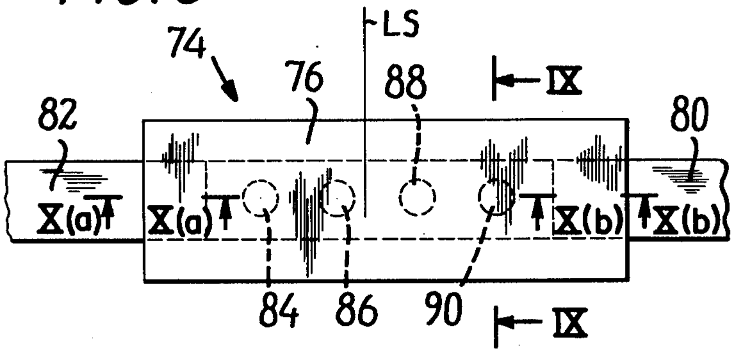
FIG. 9
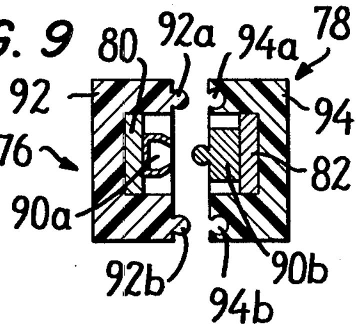
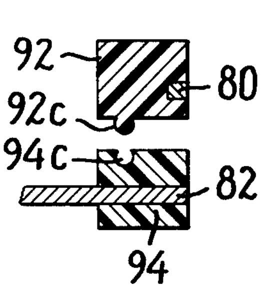
FIG. 10(a)
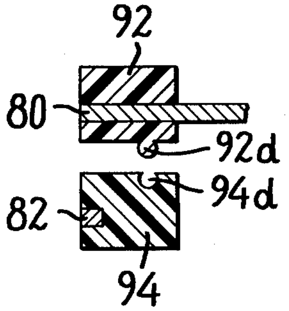
FIG. 10(b)

ELECTRICAL CONNECTOR AND ELECTRICAL CONNECTION SYSTEM EMPLOYING THE SAME

This is a continuation of application Ser. No. 793,481, filed May 4, 1977, now abandoned.

FIELD OF THE INVENTION

This invention relates to electrical connectors and connection systems and more particularly to separable connectors having sufficient flexibility and tensile strength for use in electrical connection systems wherein electrical cables are reeled into and out of use.

BACKGROUND OF THE INVENTION

In presently known apparatus and systems for underground mining operations, coal transport vehicles are provided with electrical power, from power stations situated in room and pillar sites, over continuous cables of length in the order of five hundred feet. Typically, a shuttle car operating between a mining location and an underground railway, is equipped with an interior cable winding reel which functions to take up and pay out its powering electrical cable in the course of movement of the shuttle car between such locations. Frequently, in the course of movement of such shuttle cars, occasions arise wherein the car travels over or otherwise engages its cable, sufficiently damaging the cable to require interruption of car activities for cable maintenance. At present, such maintenance involves the on-site splicing of damaged cable strands, an operation which is both time consuming and cumbersome. At times, a cable is spliced so extensively as to require replacement, in which case down-time increases to quite undesired proportions. Mining efficiency evidently suffers proportionately with down-time attributable to the number of cable maintenance operations and replacement activity.

The use of continuous cable runs of such extended length in mining operations is believed to be based principally on several operational considerations. At the outset, the requirement for cable reeling about a reel of some six to ten inches in diameter within the shuttle car necessitates a high degree of cable flexibility. High tensile strength is a further requirement, being in the order of five hundred to one thousand pounds occasioned by the stress placed thereon in the course of shuttle car movement. Relative uniformity of cross-section is also demanded to enable the cable to travel freely through the cable issue/take-up port of the shuttle car. The possibility of the use of a cable having separable sections connected by large-scale couplers or connectors customarily used in interconnecting mining cables is prohibited by this latter consideration alone. Other factors promoting use of continuous cable runs are believed to be the moisture-proof character and high current capability characteristics of continuous cables.

SUMMARY OF THE INVENTION

The present invention has as its object the provision of an improved electrical connection system and connectors for applications of type discussed above.

In attaining this object, the invention provides an electrical connector system involving a cable having separable sections, individual sections being joined by connectors of type permitting the sectioned cable to exhibit flexibility and tensile strength throughout which adapts it for use in the foregoing and like applications.

The foregoing and other objects and features of the invention will be further evident from the following detailed description of the preferred embodiment of the invention and from the drawings wherein like reference numerals identify like parts throughout.

DESCRIPTION OF THE DRAWINGS

FIG. 4 is a plan view of load sustaining members 46 and 48 of FIG. 3, partly broken away to show detail.

FIG. 4(*a*) is a sectional view of the FIG. 4 structure as seen from plane IVa—IVa of FIG. 4.

FIG. 5 is a sectional view of the FIG. 4 structure as seen from plane V—V of FIG. 4 with female contacts omitted.

FIG. 5(*a*) depicts an alternate to the FIG. 5 load-sustaining structure.

FIGS. 6 and 7 illustrate respective opposite bending configurations for the connectors of FIG. 2.

FIG. 8 is a plan elevation of a further embodiment of a connector according with the invention.

FIG. 9 is a sectional view taken along lines IX—IX of FIG. 8.

FIGS. 10(*a*) and 10(*b*) are sectional views as seen respectively from planes X(a)–X(b) of FIG. 8.

DESCRIPTION OF THE PREFERRED EMBODIMENT

Figures 1, 2, 3:
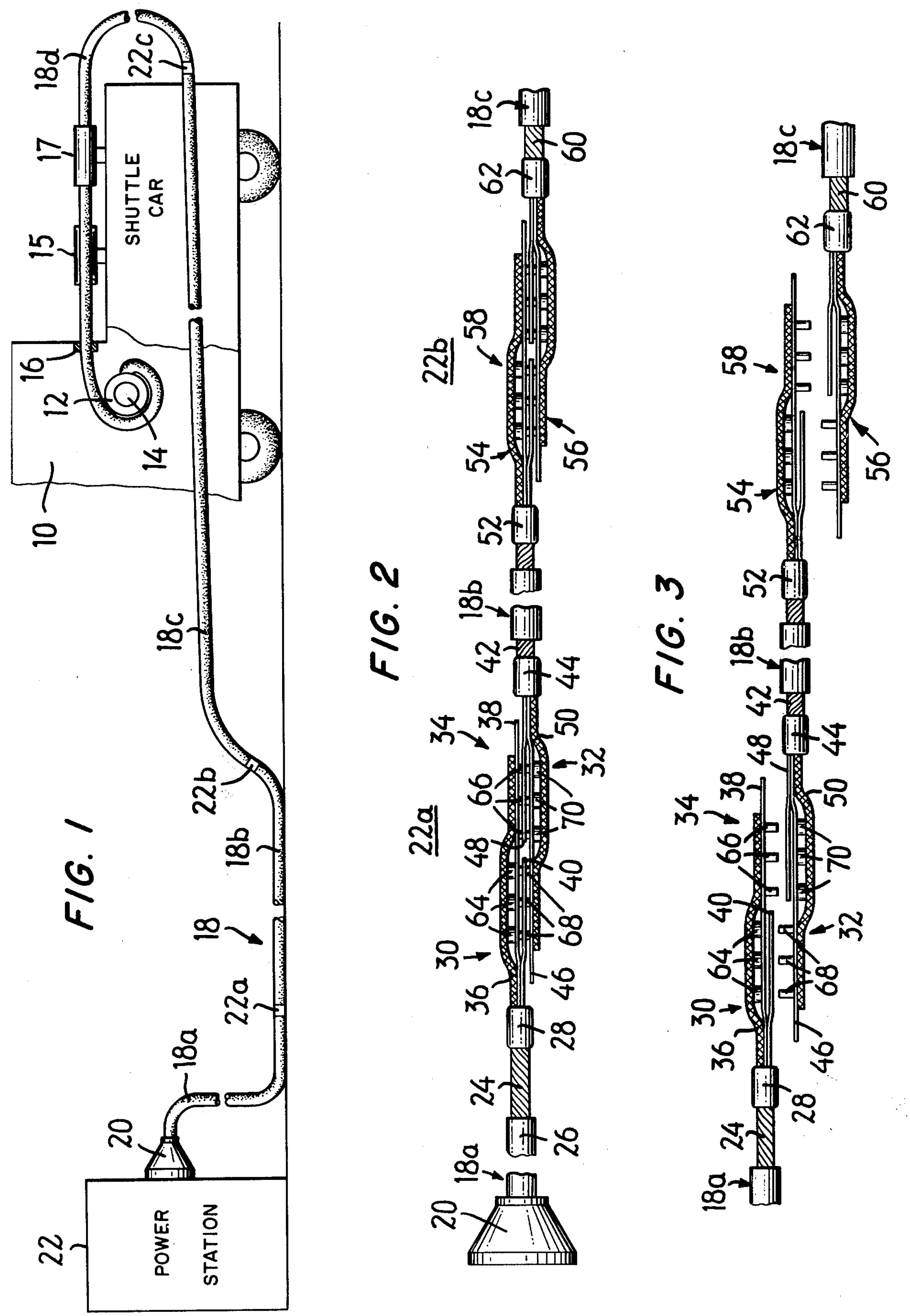
FIG. 1 illustrates schematically a shuttle car and underground power station interconnected by the electrical connection system of the invention.
FIG. 2 illustrates successive cable sections and connectors according with the invention.
FIG. 3 is a repetitive showing of FIG. 2 with the connectors disconnected to illustrate the connector elements thereof in further detail.

Referring to FIG. 1, shuttle car 10 includes a reel 12 rotatively driven by drive shaft 14 to effect the take-up and pay-out of electrical cable through cable issue guide ring 16. Cable 18 is taken up and payed out at the forward end of the vehicle, being passed to the guide ring by sheaves 15 and 17. Ring 16 is supported in a slot for movement inwardly of the plane of FIG. 1 to facilitate the laying of cable 18 axially on reel 12. Cable 18 is connected at its rightward end through customary collector and brush apparatus associated with reel 12 to furnish power to the power-operated apparatus of the shuttle car. At its leftward end, cable 18 is connected to coupler 20 which is secured to power station 22. Typically, electrical power is brought into station 22 at approximately 5 KV and is stepped-down and possibly rectified therein to voltage level suitable for use in shuttle car 10 by appropriate transformer and circuit breaker circuitry.

Cable 18 is provided in mutually separable sections 18*a*–18*d* with connector assemblies 22*a*–22*c* providing for interconnection of the individual cable sections. The cable sections are preferably provided in lengths of one hundred feet, whereby, for a typical application, five such individual sections may be employed. With this arrangement, on damage to the cable, an individual section is directly removed and a replacement section installed. The removed section may then be repaired at leisure, with system down-time accordingly decreased from that obtaining in the present continuous cable practice discussed above. Desirably, the connector assemblies of the cable sections include connector elements which are matable with all other connector elements, whereby re-laying of a cable section to provide for connector element compatibility may be avoided.

For convenience of illustration and discussion, cable section 18*a* is shown in FIG. 2 as insulatively encasing a single multi-strand conductor 24, which is stripped of insulation 26 along its length as indicated and is crimped by ferrule 28 to connector element 30 of connector assembly 22*a*. Such assembly 22*a* may further include an electrically insulative sheath (not shown) for sealably encasing both element 30 and connector element 32. Element 30 together with connector element 32 constitute separable connector 34. In the embodiment shown in FIG. 2, connector element 30 is inclusive of electrically conductive braiding 36 and load-sustaining members 38 and 40 and ferrule 28 engages the braiding and elements 38 and 40.

Cable section 18*b* has its conductor 42 joined by ferrule 44 to load-sustaining members 46 and 48 and braiding 50 of connector element 32. At its opposite end, conductor 42 is connected by ferrule 52 to the braiding and load-sustaining members of connector element 54, separably coupled to connector element 56 and together defining connector 58. Cable section 18*c* has its conductor 60 crimped together with the components of connector element 56 by ferrule 62.

As is better seen in FIG. 3, wherein connectors 34 and 58 are disconnected, connector element 30 has female contacts 64 and male contacts 66. Counterpart connector element 32 includes male contacts 68 and female contacts 70. The respective male and female contacts have a common joinder direction transversely of their associated elongate cable sections and engage one another, as shown in FIG. 2, upon movement in such joinder direction.

In FIG. 4, load-sustaining members 46 and 48 are shown as seen with male contacts 68 and one of female contacts 70. Member 46 is of greater length than member 48 and contacts 68 are in the form of rivet-like units extending through apertures in the leftward portion thereof. In its rightward portion, member 46 has a central slot 46*a* and, rightwardly thereof, is secured as by spot welding (SW, FIG. 5) to member 48. Member 48 defines openings 48*a*, 48*b* and 48*c* in registry with slot 46*a*. As best shown in FIG. 5, slot 46*a* extends somewhat beyond openings 48*a* and 48*c*. Further, the openings have extent longitudinally of elongate member 48 exceeding the longitudinal extent (diameter) of the male contacts of the connector elements. Referring to FIGS. 4 and 4(*a*), female contact 70 is supported on the surface of member 46 furthest from member 48, whereby socket 70*a* extends in a direction outwardly of, i.e., aside, the plane of joinder of its contact element 32 with mating contact element 30 (FIG. 2). Such plane of joinder will be seen to be defined by load-sustaining shorter members 40 and 48 (FIG. 2), i.e., a plane traversed only by male contacts on joinder of the connector elements. By this configuration, close disposition of load-sustaining member 40 with member 46 and of load-sustaining member 38 with member 48 is achieved, enhancing ability of the connectors to bend, as shown in FIGS. 6 and 7 and discussed below. In its preferred construction, contact 70 includes a can 70*b* secured to member 46, a contact clip 70*c* defining socket 70*a*, a braiding-receiving member 70*d* and rivet 70*e* joining the parts as shown. Socket 70*a* will be seen to extend longitudinally with slot 46*a* such that male contacts engaging clip 70*c* may move longitudinally while maintaining electrical connection therewith in the course of connector bending. Clip 70*c* desirably engages the interior walls of can 70*b* to increase contact pressure strength.

With connector 34 under longitudinal load in its FIG. 2 disposition, male contacts 66 transfer load between opposed longer member 38 and shorter member 48 since contacts 66 are rigidly secured to member 38 and abut the leftward sides of the openings 48*a*–48*c* shown in FIG. 5. A like situation applies as between opposed longer member 46 and shorter member 40 through male contacts 68 which are rigidly secured to member 46 and abut the rightward sides of slots in member 40. Braidings 36 and 50 (FIG. 2) are laid over members 38 and 46 in relatively loose manner and are electrically secured thereto by the braid-receiving member noted above, whereby the braidings are free from loading. Beryllium copper is preferably used for the load-sustaining members.

In FIGS. 6 and 7 connector 34 is shown in respectively convex and concave bending dispositions in which the connector may be found in when the cable system is reeled into the shuttle car in clockwise (C) reeling and counterclockwise (CW) reeling. Under these conditions, the ability of the cable to bend predominates as a performance characteristic over its tensile load-sustaining ability. Thus tensile stress lessens as flexure of the cable occurs. Flexure of the connector is enhanced by the abovenoted closeness of the connector elements to one another, whereby members 40 and 48 are essentially aligned at a common joinder interface. In this respect, the connector may be considered as an I-beam of two sections which are the respective connector elements. As is known, the flexibility of an I-beam increases as the transverse spacing between its sections decreases.

In the FIG. 6 bending mode, tensile load is transmitted through contacts 66 from member 48 to member 38, the contacts being in abutment with the rightward sides of the openings in member 48. By virtue of relative bending movement of member 40 and member 46, contacts 68 are disposed away from the rightward sides of the openings in member 40 and thus become ineffective in their previous load-transmitting function. Accordingly, load sharing by coaction of members 40 and 46 does not occur in such FIG. 6 concave bending of connector 34.

In the FIG. 7 bending mode, tensile load is transmitted conversely between members 40 and 46 through contacts 68. Here, contacts 66 assume positions nonabutting with the leftward sides of the slots in member 48 and do not transmit load as between members 48 and 38.

The relative bending movement of the load-sustaining members common to each connector element may be accommodated alternatively by the arrangement shown in FIG. 5(*a*) where a loop L or the like serves such purpose in place of spot-welding SW of FIG. 5.

The connectors of FIGS. 2–7 are adapted for use particularly in applications demanding high tensile load resistance and flexibility in the face of size constraints. In the noted mining industry application, the issue port of the shuttle car imposes such size constraint, whereby the connectors in parent connector assembly, i.e., with encasing sheath, may not be of cross-sectional extent much in excess of the cable. The depicted arrangement of load-sustaining members enables tensile stress reducing by load sharing and meets the imposed size-constraints. The common joinder plane aspect and provisions for shifting from load sharing enhance flexure capability adaptively to lessened tensile loading conditions. Connector 74 shown in FIGS. 8 through 10(*b*) is adapted for use where lesser tensile loading applies than in the foregoing industrial application and in other instances. This connector includes connector elements 76 and 78, having conductors 80 and 82 extending respectively outwardly thereof for connection to cables or cable sections to be electrically interconnected. Contact sets 84–90 serve to electrically connect elongate conductors 80 and 82 and are longitudinally spaced therealong. Each contact set comprises a female contact, such as is shown at **90*a* in FIG. 9 secured to conductor 80, and a male contact, such as is shown at 90*b* in FIG. 9 secured to conductor 82. The contacts interfit in a joinder direction transverse to the longitudinal extent of conductors 80 and 82. Connector sheaths 92 and 94 are provided with marginal projections 92*a*, 92*b*, 92*c* and 92*d* which interfit with marginal recesses 94*a*, 94*b*, 94*c* and 94*d* to provide for sealable, moisture-retardant coupling of the sheaths. All contacts of connector element 76 are shown to be of female type and the contacts of element 78** of male type.

Figure 11:
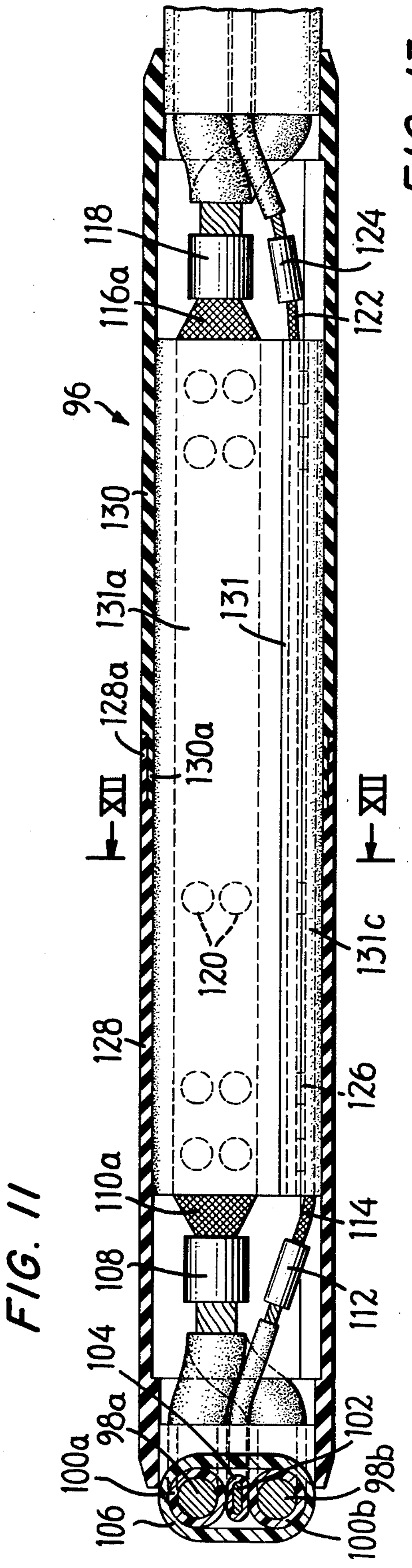
FIG. 11 is a plan elevation of a further connector arrangement of the invention with its encircling housing sectioned to show detail.

Referring to FIG. 11, connector assembly 96 provides for separable interconnection of cables of type having two single cylindrical multi-strand conductors **98*a* and 98*b* encased in insulation 100*a* and 100*b* and a further flat conductor 102 encased in insulation 104. The cylindrical conductors are live lines and the flat conductor is a ground line. All are encased within outer insulation 106. Insulation is stripped from the live conductors and each thereof is crimped by a ferrule, ferrule 108 shown for conductor 98*a* to conductive braidings 110*a* and 110*b*. The ground conductor has its insulation stripped for connection thereof by ferrule 112 to conductive braiding 114. As is shown in the cross-sectional view of FIG. 12, the respective braidings 110*a* and 110*b* of the live conductors are placed outwardly of braidings 116*a* and 116*b* which are each secured by a ferrule, ferrule 118 shown for braiding 116*a* to the live conductors of the rightward downstream cable. Matable contacts 120 are secured respectively to braidings 110*a*, *b* and 116*a*, *b*, longitudinally spacedly as indicated in FIG. 11 for providing electrical interconnection of the braidings. As in the case of the above-described contacts, contacts 120 are of male and female variety joinable in a joinder direction transversely of the longitudinal axis of elongate connector assembly 96. T-shaped body 131 and members 131*a*, 131*b* and 131*c* (FIG. 12) fill the interior of the FIG. 11** assembly.

Figure 12:
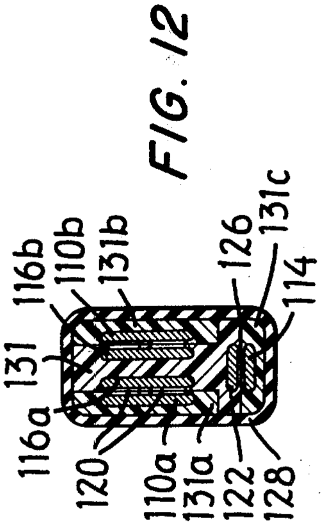
FIG. 12 is a sectional view as seen from plane XII—XII of FIG. 11.

Braiding 114 of the ground line and braiding 122, connected to the downstream ground line by ferrule 124 are joined by contacts 126. As shown in FIG. 12, braidings 114 and 122 are situated orthogonally with respect to braidings **110*a*, *b* and 116*a*, *b*. Here again, however, contacts 126 are joined in a joinder direction transversely of the longitudinal axis of connector assembly 96. Separable sheaths 128 and 130 are provided with interfitting end sections 128*a* and 130*a* and sealably engage insulation 106** of the leftward cable and the corresponding insulation of the rightward cable, respectively.

Figure 13:
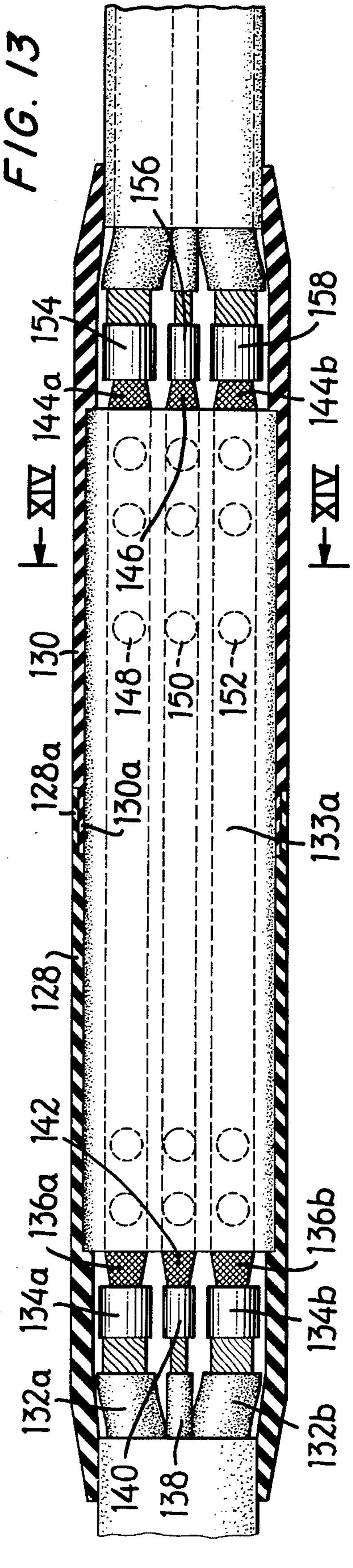
FIG. 13 is a plan elevation as in FIG. 11 of a still further connector embodiment of the invention.
Figure 14:
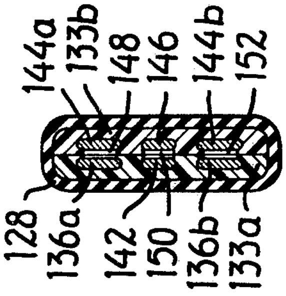
FIG. 14 is a sectional view as seen from plane XIV—XIV of FIG. 13.

An alternate connection scheme for multi-conductor cables is shown in FIGS. 13 and 14. Live conductors **132*a* and 132*b* have their insulation stripped and are connected by ferrules 134*a* and 134*b* to conductive braidings 136*a* and 136*b*. Ground conductor 138 is stripped and connected by ferrule 140 to conductive braiding 142. Braidings 136*a*, 142 and 136*b* are arranged in facing relation respectively with braidings 144*a*, 146 and 144*b* and are connected thereto by contacts 148, 150 and 152. Ferrules 154, 156 and 158 connect braidings 144*a*, 146 and 144*b* with the live and ground conductors of the downstream cable. In this arrangement, all contacts for the respective braidings are joinable in a common joinder direction transversely of the contact assembly longitudinal axis. Members 133*a* and 133*b* (FIG. 14) fill the interior of the FIG. 13** assembly.

Figure 15:
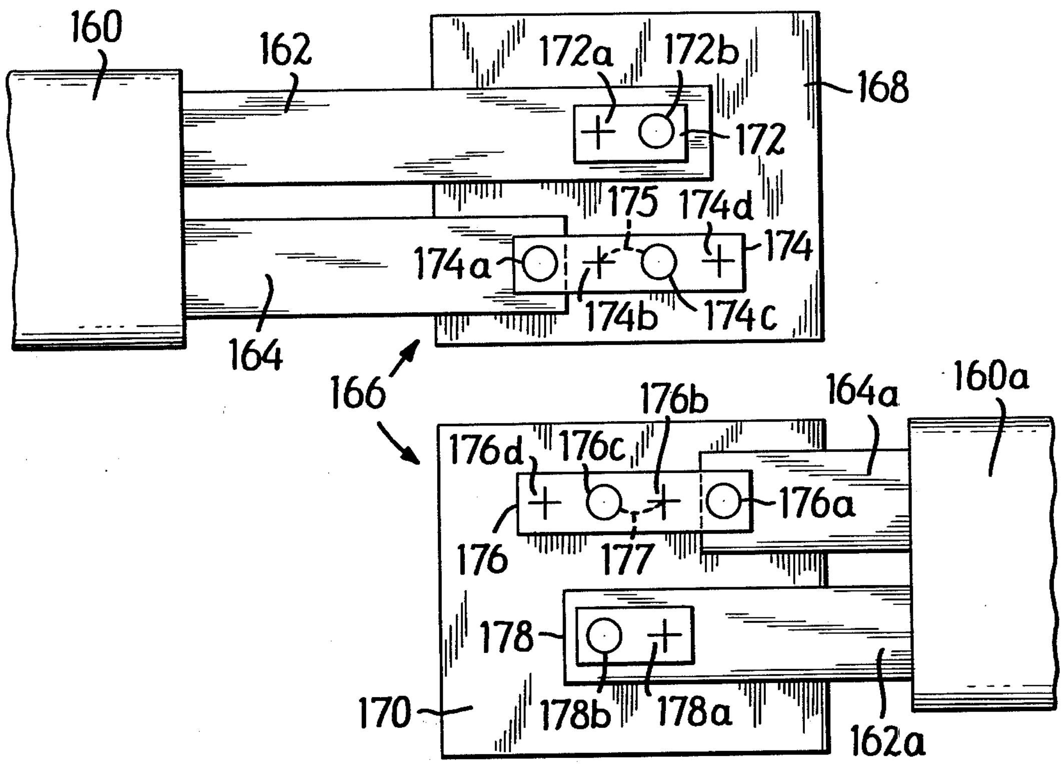
FIG. 15 illustrates a connector embodiment particularly adapted for use in ground-check type connection systems.

In FIG. 15, cable 160 includes plural live and ground conductors, one shown at 162, and a so-called ground-check conductor 164. In certain connection systems, this conductor is carried through the system to monitoring apparatus which looks continually at the electrical continuity of the conductor in its passage together with the ground conductor, amidst the various connectors and powered apparatus of the system. Upon discontinuance of electrical continuity in the ground or ground-check conductors, the monitoring apparatus interrupts system power. In connectors of known type which have joinder and separation directions aligned longitudinally with cables joined thereby, provision is made for interrupting continuity first in the ground-check conductor. For this purpose there is provided a ground-check line connector element having a male contact shorter in length than other male contacts and hence separable from its female contact before the separation of live and ground contacts on movement of a connector element housing fixedly supporting all male contacts.

Connector 166 of FIG. 15 provides for like interruption of continuity first in ground-check conductor 164 and thereafter in other conductors, such as 162, irrespective of the manner in which its flexible connector elements 168 and 170 are peeled from one another.

Connector element 168 has contact strip 172 connected to conductor 162 with contacts **172*a* and 172*b* arranged successively outwardly from cable 160 in the pattern MF (M for male, F for female). Contact strip 174 is connected to conductor 164 and has contacts 174*a*–174*d* in pattern FMFM successively outwardly from cable 160. For contact strip 172, contacts 172*a* and 172*b* are each electrically connected to conductor 162. Only contact 174*a* of contact strip 174 is electrically connected directly to conductor 164. Contacts 174*b* and 174*c* are directly electrically interconnected by jumper 175**.

Connector element 170 includes contact strip 176 electrically connected by contact **176*a* alone to ground-check conductor 164*a* of cable 160*a*. Contacts 176*a*–176*d* are in pattern FMFM successively outwardly of cable 160*a*. Jumper 177 interconnects contacts 176*b* and 176*c*. Contact strip 178 of element 170 has each of its contacts 178*a* and 178*b* electrically connected to live/ground line 162*a* of cable 160*a*. The pattern of contacts 178***a* and 178*b* is MF successively outwardly of cable 160*a*.

Figure 16:
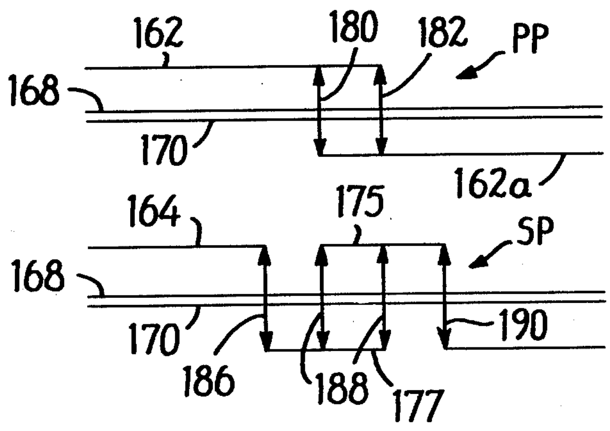
FIG. 16 is a schematic illustration showing the diverse paths of electrical continuity provided in the FIG. 15 connector.

On engagement of connector elements 168 and 170, as shown schematically in FIG. 16, two parallel circuit paths PP extend between high current carrying conductors 162 and 162*a*. Path 180 is through MF contact pair 172*a* and 178*b* and path 182 is through FM contact pair 172*b* and 178*a*. A single series circuit path SP extends between ground-check conductors 164 and 164*a*, having section 186 (contacts 174*a* and 176*d*, FM), section 188 (174*b* and 176*c*, MF and 174*c* and 176*b*, FM) and section 190 (174*d* and 176*a*, MF).

If connector element 168 is peeled from connector element 170, interruption in electrical continuity occurs first between ground-check conductors 164 and 164*a*, i.e., as section 190 of the series circuit path SP is broken. The same condition obtains if element 170 is peeled from element 168, since section 186 of the series circuit path is broken at the outset of the peeling. Accordingly, the monitoring apparatus receives indication of ground-check discontinuity prior to the opening of live conductors 162 and 162*a*, and thus may interrupt system power before such event. This performance capability is achieved in the FIGS. 15 and 16 elongate contact strip embodiment by having ground-check contact pairs longitudinally outwardly of other contact pairs and by series circuit connection of such ground-check contact pairs.

As will be observed by comparison of the connector elements of FIG. 15 with the connector elements of FIG. 8, the invention contemplates separable elements which are identical in contact pattern (non-polar elements) or differ in respective contact patterns (polar elements). In FIG. 15, the patterns MF for strips 172 and 178 and FMFM for strips 174 and 176 provides for non-polar connector elements. Such patterns could be of other variety, e.g., MFMFMF, asymmetric about a median line thereof (MFM, then median line, then FMF). Use of such non-polar elements permits system universality, avoiding need for polar-relaying of a cable already laid to provide connector element matching. The FIG. 8 connector, on the other hand, has element 76 in pattern FFFF to be polar-mated with pattern MMMM of element 78. It should be noted that the grund-check capability can be had in polar as well as non-polar arrangements.

The non-polar load-sharing connector elements of FIGS. 2–7 may be rendered polar by rearrangement of the shorter and longer members (48 and 46 of FIG. 5) such that the shorter members are transversely outward of the longer members. The male connector element has a first set of male contacts secured to its longer member and a second set of male contacts secured to its shorter member and extending freely through openings in its longer member. The female connector element has one set of female contacts secured aside its longer member for joinder with the second set of male contacts and another set of female contacts secured aside its shorter member for joinder with the first set of male contacts which extend through openings in the longer member of the female connector element. In this version, the joinder plane is juxtaposed with the longer members of the connector elements, and the connector has the advantage of recessing its shorter members outwardly of the plane of joinder. The invention contemplates a tongue and groove or like interfitting of the free end of the shorter members with the longer members in the connector of FIGS. 2–7.

While the illustrated contacts are rivet (male) and socket (female) joined to the braiding (FIG. 11) or secured to a load-sustaining member (FIG. 4), the invention of course contemplates other forms of contacts. These and other modifications may be undertaken without departing from the invention. Thus, the particularly preferred embodiments described and discussed are intended in an illustrative and not in a limiting sense. The true spirit and scope of the invention is set forth in the following claims.

What is claimed is:

1. In combination: an electrical cable and mobile means for mining connected to said cable and electrically powered thereby, said mobile means having reeling means for take-up and pay-out of said cable, said cable being comprised of plural cable sections and including an elongate connector assembly for releasably electrically interconnecting said cable sections, said connector assembly including joined first and second connector elements separable from one another by relative movement thereof transversely of the longitudinal axis of said connector assembly, said first and second connector elements having respective contact support members with contacts having joinder directions extending transverse to such connector assembly longitudinal axis, each such contact support member having flexure capability enabling, in the course of such reeling, convex and concave bending disposition of said connector assembly along said longitudinal axis and hence circular disposition thereof with such plural cable sections connected thereby.

2. The invention claimed in claim 1 wherein said first and second connector elements include contact support members in respective facing relation aside a joinder plane and wherein said contacts are of first and second configurations, all contacts of said first configuration having the entirety thereof disposed aside said joinder plane.

3. The invention claimed in claim 2 wherein said contacts of said first configuration define sockets extending transversely of said connector assembly longitudinal axis and wherein said contacts of said second configuration comprise projections extending across said joinder plane into said sockets.

4. In combination: an electrical cable and mobile means for mining connected to said cable and electrically powered thereby, said mobile means having reeling means for take-up and pay-out of said cable, said cable being comprised of plural cable sections and including an elongate connector assembly for releasably electrically interconnecting said cable sections, said connector assembly including joined first and second connector elements separable from one another by relative movement thereof transversely of the longitudinal axis of said connector assembly, said first and second connector elements having contact support members with contact having joinder directions extending transversely to such connector assembly longitudinal axis, each such contact support member having flexure capability enabling in the course of such reeling, arcuate disposition of said connector assembly longitudinal axis and hence circular disposition thereof with said plural cable sections connected thereby and, wherein said first and second connector elements include contact support members in respective facing relation aside a joinder plane and wherein said contacts are of first and second configurations, all contacts of said first configuration having the entirety thereof disposed aside said joinder plane, and wherein each of said first and second connector elements includes contacts of both said first and second configurations.

5. The invention claimed in claim 4 wherein said first connector element includes a further member disposed in load sharing relation with said first connector element contact support member and engaging said contacts of said second configuration of said second connector element, such further member and said first connector element contact support member each separately transferring load to the cable section connected to said first connector element.

6. The invention claimed in claim 5 wherein such load sharing member defines openings for passage therethrough of said contacts of said second configuration of said second connector element.

7. The invention claimed in claim 6 wherein said contacts of said first configuration define sockets having longitudinal extent facilitating longitudinal movement of said contacts of said second configuration in said contacts of said first configuration.

8. The invention claimed in claim 6 further including means for rigidly securing said contact support member and such load sharing member of said first connector element to such cable section connected to said first connector element.

9. The invention claimed in claim 1 wherein said first connector element is fixedly connected to a first of said cable sections and includes plural contacts spaced along such connector assembly longitudinal axis in predetermined pattern in direction outwardly of such first cable section.

10. The invention claimed in claim 9 wherien said second connector element is fixedly connected to a second of said cable sections and includes plural contacts spaced along said connector assembly longitudinal axis in said predetermined pattern in direction outwardly of such second cable section.

11. The invention claimed in claim 1 wherein said first and second connector elements include respective interfitting means for sealable releasable joinder thereof.

12. The invention claimed in claim 1 wherein said connector assembly includes sheath means for sealably encasing said first and second connector elements and portions of cable sections joined thereby.

13. The invention claimed in claim 12 wherein said sheath means comprises sheath parts separable by relative movement thereof along such connector assembly longitudinal axis.

14. An elongate connector assembly for releasably electrically interconnecting electrical cables, said connector assembly including first and second connector elements joined to one another by interfitting of contacts thereof, said connector elements being separable by relative movement thereof transversely of the longitudinal axis of said connector assembly, said first and second connector elements including elongate contact support members in respective facing relation aside a joinder plane, said contacts being of first and second configurations, each said connector element including a further member extending longitudinally with the contact support member thereof, each connector element and its corresponding further member having flexure capability enabling arcuate disposition thereof with respect to their common longitudinal extent, said further member and said contact support member each absorbing distinct parts of longitudinal tensile loads imposed on said connector element.

15. The connector assembly claimed in claim 14 wherein said contacts of said first configuration define sockets and wherein said contacts of said second configurations comprise projections extending across said joinder plane into said sockets.

16. The connector assembly claimed in claim 14 wherein each of said first and second connector elements includes contacts of both said first and second configurations.

17. The connector assembly claimed in claim 14 wherein said first and second connector elements include respective interfitting means for sealable releasable joinder thereof.

18. In combination: a pair of electrical cables, each having respective first and second conductors; and an elongate connector assembly releasably electrically interconnecting said first conductors to one another and said second conductors to one another through respective first and second joined connected elements having respective first and second contacts spaced along, and separable from one another by relative movement thereof transversely of, the longitudinal axis of said connector assembly, said first contacts being in electrical series connection and said second contacts being in electrical parallel connection, the longitudinal spacing between longitudinally outermost of said first contacts exceeding the longitudinal spacing between longitudinal outermost of said second contacts whereby electrical interconnection of said first conductors is interrupted prior to interruption of electrical interconnection of said second conductors upon such separation of said first and second connector elements.

19. The invention claimed in claim 18 including reeling means for take-up and pay-out of said cables, each of said first and second connector elements including a contact support member having flexure capability enabling, in the course of such reeling, arcuate disposition of said connector assembly longitudinal axis and hence circular disposition thereof with said cables.

20. A connector assembly for releasably electrically interconnecting electrical cables, said connector assembly including first and second connector elements joined to one another by interfitting of contacts thereof, said first and second connector elements including contact support members in respective facing relation aside a joinder plane, said contact support member of said first connector element including a member disposed in load sharing relation with said first connector element contact support member and engaging at least one of the contacts of said second connector element.

21. The connector assembly of claim 20 wherein each of said first and second connector elements include contacts of both first and second configuration and said load sharing member engages contacts of said second configuration on said second connector element.

22. The connector assembly claimed in claim 21 wherein a further member of said first connector element defines openings for passage therethrough of said contacts of said second configuration of said second connector element.

23. The connector assembly claimed in claim 21 wherein said contacts of said first configuration define sockets having longitudinal extent facilitating longitudinal movement of said contacts of said second configuration in said contacts of said first configuration.

24. The invention claimed in claim 21 wherein the spacing along such connector assembly longitudinal axis between longitudinally outermost of said contacts of said first connector elements exceeds the spacing along such connector assembly longitudinal axis between longitudinally outermost of said contacts of said second connector elements.

25. In combination: a pair of electrical cables, each having respective first and second conductors; and an elongate connector assembly releasably electrically interconnecting said first conductors to one another and said second conductors to one another through respective first and second joined connector elements having contact separable from one another by relative movement thereof along contact joinder axes extending transversely of the longitudinal axis of said connector assembly, said joinder axes of said first and second connector elements being so spaced longitudinally of said connector assembly as to effect interruption of electrical interconnection of said first conductors prior to interruption of electrical interconnection of said second conductors upon such separation of said first and second connector elements, such contacts of said first connector elements defining a series circuit through said first connector elements, such contacts of said second connector elements defining plural parallel circuits through said second connector elements.

* * * * *